United States Patent
Faruquie et al.

(10) Patent No.: US 8,010,595 B2
(45) Date of Patent: Aug. 30, 2011

(54) EXECUTION OF SERVER-SIDE DYNAMIC PAGES

(75) Inventors: Tanveer A Faruquie, New Delhi (IN); Sandeep Jindal, Chandigarh (IN); Abhishek Verma, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 11/289,147

(22) Filed: Nov. 29, 2005

(65) Prior Publication Data

US 2007/0124479 A1  May 31, 2007

(51) Int. Cl.
*G06F 15/16* (2006.01)
(52) U.S. Cl. .......................... 709/203; 709/219
(58) Field of Classification Search .................. 709/203
See application file for complete search history.

(56) References Cited

U.S. PATENT DOCUMENTS

| | | | |
|---|---|---|---|
| 5,852,717 A | 12/1998 | Bhide et al. | |
| 5,928,323 A | 7/1999 | Gosling et al. | |
| 6,038,598 A * | 3/2000 | Danneels | 709/219 |
| 6,769,123 B1 | 7/2004 | Chan | |
| 6,820,073 B1 | 11/2004 | Bedell et al. | |
| 6,948,133 B2 * | 9/2005 | Haley | 715/780 |
| 7,359,935 B1 * | 4/2008 | Karipides et al. | 709/203 |
| 2002/0083154 A1 * | 6/2002 | Auffray et al. | 709/218 |
| 2002/0083182 A1 | 6/2002 | Alvarado et al. | |
| 2002/0111992 A1 * | 8/2002 | Copeland et al. | 709/203 |
| 2002/0198719 A1 | 12/2002 | Gergic et al. | |
| 2003/0009476 A1 | 1/2003 | Fomenko et al. | |
| 2003/0009519 A1 | 1/2003 | Gosling et al. | |
| 2003/0069906 A1 | 4/2003 | Cichowlas et al. | |
| 2004/0049579 A1 | 3/2004 | Ims et al. | |
| 2004/0088376 A1 | 5/2004 | McCanne et al. | |
| 2004/0133634 A1 | 7/2004 | Luke et al. | |
| 2006/0075120 A1 * | 4/2006 | Smit | 709/227 |

OTHER PUBLICATIONS

Kurniawan, Budi, "How Servlet Containers Work", http://www.onjava.com/pub/a/onjava/2003/05/14/java_webserver.html.

* cited by examiner

*Primary Examiner* — Ian N Moore
*Assistant Examiner* — Afshawn Towfighi
(74) *Attorney, Agent, or Firm* — Gibb I.P. Law Firm, LLC; Derek S. Jennings (57) ABSTRACT

A system (30) and method are provided for single-pass execution of dynamic pages across multiple request-response cycles. The system (30) comprises a client (32) and server (34) in communication with one another. A container (35) resides on the server and handles requests made for the result of a dynamic page (36). The container controls the processing of the dynamic page. If the dynamic page requires additional information to continue processing, an intermediate request (44) is transmitted to the client, which responds with an intermediate response (46) containing the additional information. A notifier servlet (38) receives the intermediate response and passes the information to the dynamic page so that execution can resume without interruption.

18 Claims, 5 Drawing Sheets

EXECUTION OF SERVER-SIDE DYNAMIC PAGES

FIELD OF THE INVENTION

The present invention relates generally to server-side dynamic pages, and in particular to the single-pass execution of the dynamic pages across multiple request-response cycles between a client and server.

BACKGROUND

On the Internet or World Wide Web, information is exchanged through the request-response cycle of the Hypertext Transfer Protocol (HTTP). For example, a client may initiate the cycle by submitting a request for information to a server. The request may be for a static page (such as HTML or VXML), a dynamic page (such as JSP, ASP or PHP) or a request that a particular application (such as a servlet) be executed to generate a return page. The server, upon receiving such a request from the client, performs the necessary tasks to generate the return page, such as retrieving the requested page or application, executing as required, accessing databases if needed, establishing connections to other server, etc. When the server obtains the necessary information, the server transmits a response to the client, completing the request-response cycle.

The request-response sequence established between the client and server is referred to as a "roundtrip", and is carried out for each request that a client makes. A server may service multiple requests from a single client, or alternatively, may be configured to handle request from multiple clients. In each instance, every request that a server receives must be serviced independently.

Single-pass execution of server-side dynamic pages is known in the art as disclosed in Published U.S. patent application No. 2003/0009519 (James A. Gosling, published on Jan. 9, 2003) which describes a method and apparatus for operating a local server computer of a client-server network including a technique to receive a request from a client computer of the client-server network. A determination is made whether the request requires dynamically generated information from a servlet object of the client-server network. If so, a specified servlet object corresponding to the request may be uploaded from a remote server computer of the client-server network. The specified servlet object is then executed to obtain dynamically generated information corresponding to the request.

The power of server-side pages and scripting to develop web applications comes from their ability to allow applications to leverage speed, reliability and security of server-side components, and is emerging as a popular technique for the development of voice applications. The server-side dynamic pages may be handled by a dynamic webcontent execution environment, here referred to as a container. The word "container" is commonly used to refer to mainly the dynamic webcontent execution environment for servlets and JSPs but hereinafter will also be used with reference to other dynamic pages like ASPs and PHPs to ensure consistent terminology. Similarly, the term "dynamic page" is used define the general class of server-side pages, such as ASPs, JSPs, PHPs as well as servlets, to which the present invention is application. The container receives and parses requests from clients regarding dynamic pages, transmits responses to clients based on the results of the dynamic pages and maintains state of the server-side dynamic pages. The container typically works in conjunction with an external webserver which receives HTTP requests from a client which are forwarded to the container if necessary. An example of a suitable container titled "How Servlet Containers Work" may be accessed online at http://www.onjava.com/pub/a/onjava/2003/05/14/java_webserver.html.

The container is also responsible for the execution of the appropriate servlet, JSP, PHP or ASP. Referring particularly to the execution of a servlet as an illustrative example, the init method is called once by the container after the servlet class has been instantiated to indicate to the servlet that it is being placed in service. The init method must complete successfully before the servlet may receive any requests. The container then calls the service method to allow the servlet to respond to a request. During execution of the service method, the client typically cannot affect the servlet execution, nor can the servlet request any additional information from the client. Once execution is complete, the container calls the destroy method before removing the servlet instance from service. After returning from the service method of the servlet, the container constructs and transmits the response to the client based on the result of the servlet. The connection to the web server is then terminated.

The above execution method works well for users utilizing visual prompts for information, such as Graphical User Interfaces (GUIs), which are spatial in nature. Unfortunately, the temporal nature of speech application interfaces means that the traditional single-pass execution is not well suited. Where a client is required to provide multiple fields of information, such as in an online bill payment application, the inputted data (such as credit card number and expiry date) is often validated using server-side components which make calls to databases. The GUI based application allows information to be gathered spatially and is validated by a server after submission. If any or all of the information is not valid a separate response page is returned to inform the client of the problem. However, for a voice application, information is collected temporally over a period of time using a series of question-answer-confirmation steps. An interface of this type requires that a user be informed immediately if some information is invalid. Execution of voice application using the traditional single-pass approach is cumbersome and would result in frustration for users who would be required to verbally re-enter all information before another attempt at verification could occur.

It is an object of the present invention to at least reduce one or more of the foregoing problems.

SUMMARY

An aspect of the present invention provides a method for executing a dynamic page on a server-side computer in a client-server environment. A request is received from a client for execution of said dynamic page. Execution of the dynamic page is initiated. At each instance when the executing dynamic page requires additional information from the requesting client to continue execution, then: (a) an intermediate request for information is transmitted from the dynamic page to the client and a wait state for said executing dynamic page is entered, (b) requested information from the client is received by a notifier entity and the information is passed to the executing dynamic page; and (c) execution of the executing dynamic page continues utilizing the information. A response is transmitted to the client based upon the result of the dynamic page.

Another aspect of the present invention provides a system for executing a dynamic page. A first receiving means receives a request from a client for execution of a dynamic page, and a processing means processes the requested dynamic page. A transmitting means transmits to a client an intermediate request for additional information when such additional information is required, and a second receiving means receives the requested additional information from the client. The transmitting means is further configured to transmit a response to the client based upon the result of said processing dynamic page.

Other aspects of the present invention provide a computer program product comprising a computer readable medium having a computer program recorded therein for executing a dynamic page according to the methods described herein.

There is further disclosed a system for executing a dynamic page. A first receiver receives at least a request from a client for a dynamic page, and a processor processes the requested dynamic page. A transmitter transmits an intermediate request for additional information to the client, and a second receiver receives the requested additional information from the client. The transmitter is configured to transmit a response to said client based upon the result of said processing dynamic page.

DETAILED DESCRIPTION OF THE PREFERRED EMBODIMENTS

Known Implementation

Figure 1:
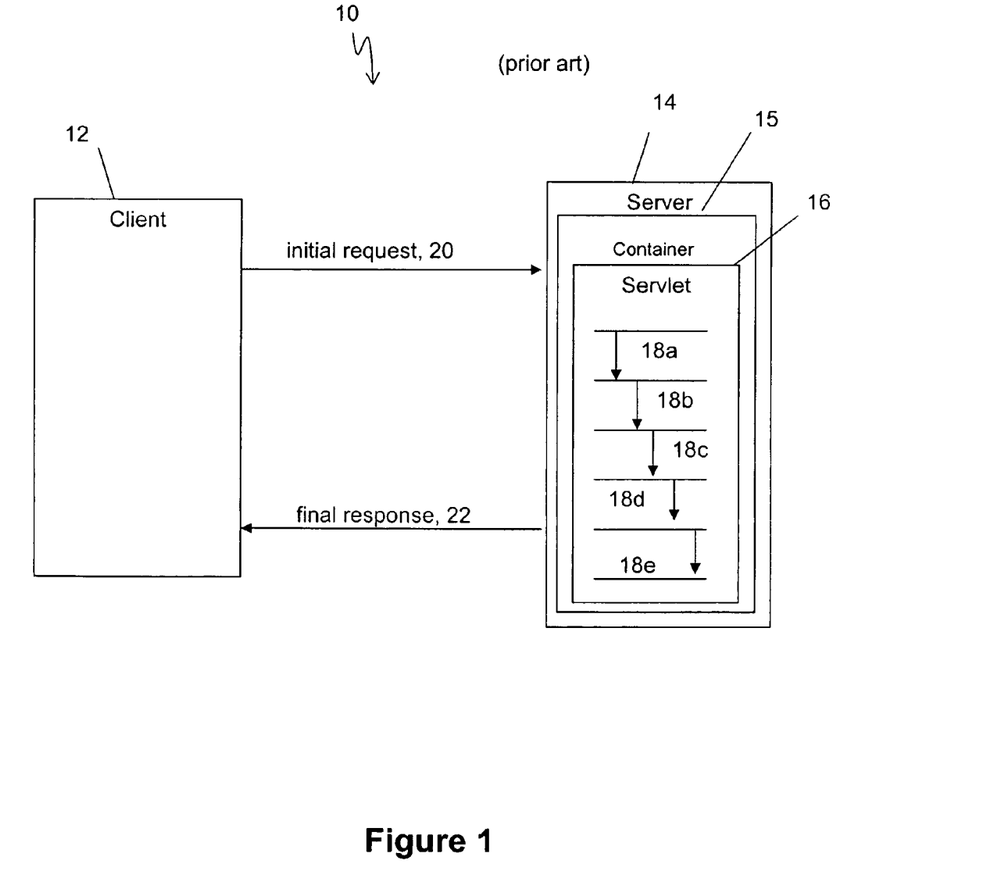
FIG. 1 is a functional block diagram showing the execution of a dynamic page according to the prior art.

FIG. 1 is a functional block diagram of a system 10 comprising a client 12 and a server 14. The client 12 and server 14 are performing a roundtrip operation, according to a known implementation. In the system 10, the client 12 and the server 14 communicate directly with one another, without an intermediary. The server 14 may be, for example, a J2EE compliant web server that can communicate with clients, and comprises a container 15 for handling JSPs and servlets. The client 12 transmits a request 20 to the server 14 when it requires the result of a dynamic page, such as a servlet 16. If the requested page is a JSP, it is compiled into the corresponding servlet 16. Referring particularly to the execution of servlet 16 as an illustrative example, if the servlet 16 is being executed for the first time, the container 15 loads the servlet 16 and calls the init method. The container then executes the service method of the servlet 16. As an example, consider the servlet 16 comprises multiple code blocks 18a-18e. The complete execution of the servlet 16 requires that each of the code blocks 18a-18e are successfully executed. Once all code blocks 18a-18e have been executed, the service method ends and a final response 22 is transmitted to the client 12. This constitutes a request-response cycle for the servlet 16. A similar prior-art system may be utilized for the execution of an ASP residing within an ASP container, however, the ASP does not require compilation into a servlet, as the ASP is scripted to be executed in code blocks.

In the system 10, the servlet 16 may require additional information to complete the execution of the request 20 of the client 12. Two methods of achieving this according to the prior art are (i) suspend execution of the servlet 16 and request the information from the client 12, and re-visit the servlet 16 with the additional information, taking care to restart execution from the point of suspension, or (ii) write each code block 18a-18e as a separate JSP. The first method requires complicated state management of the servlet 16 (especially when retrieving further information), and the second method is not scalable.

Embodiment

Figure 2:
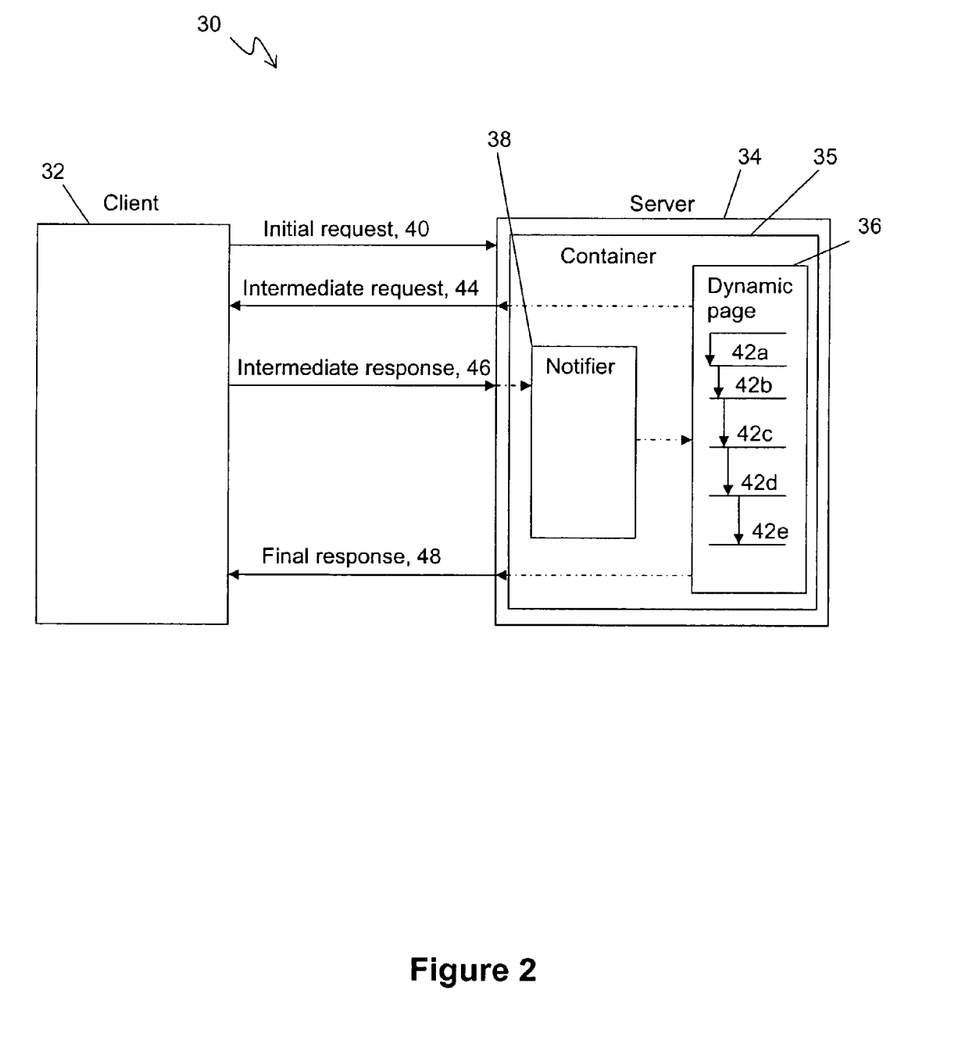
FIG. 2 is a functional block diagram illustrating the execution of a dynamic page according to an embodiment of the present invention.

Referring now to FIG. 2 there is illustrated a functional block diagram of a system 30 for single-pass execution of dynamic pages such as servlets, ASPs and JSPs across multiple request-response cycles. The system 30 comprises a client 32 and a server 34 that communicate with one anther directly, without the need for an intermediary. When the client 32 requests a page incorporating the results of a dynamic page 36, an initial request 40 is transmitted to the server 34. The server 34 may contain multiple dynamic pages 36 which are stored within, and managed by a container 35. If the requested page is a JSP, the container 35 compiles the JSP into the corresponding servlet. A request to an ASP or a servlet (which may also reside in their respective containers, but are not shown) are executed without needing to compile. It is useful to consider the dynamic page 36 as having multiple consecutive code blocks 42a-42e, with each block being executed in series, to complete the execution of the dynamic page 36. If, at the end of any of the code blocks 42a-42e, additional information is required to continue execution, the dynamic page 36 transmits an intermediate request 44 via the server 34 to the client 32. The intermediate request 44 is sent in the appropriate markup of the client 32, such as HTML, XML, VXML etc, which is determined from the initial request 40 made by the client 32. To ensure that execution can continue from the appropriate point, the dynamic page 36 enters a wait state prior to transmitting the intermediate request 44. The client 32 receives the intermediate request 44, enters the requested information and transmits an intermediate response 46 to a notifier entity. The notifier need not be a servlet but any entity that is able to receive the request from the client, parse it, extract the relevant information and pass it to the waiting dynamic page so that it can resume execution using the information passed by the notifier entity. For servlets and JSPs the implementation is a simple notifier servlet, however in general it can be any software entity which is implemented inside the container. The notifier entity 38 passes the information on to the executing dynamic page 36 and notifies the executing dynamic page 36 that processing can continue. If the information contained within the intermediate response 46 is not appropriate, then the dynamic page 36 will re-transmit an intermediate request 44, and re-enter the wait state until another intermediate response 46 is received from the client 32. This process of re-transmitting the intermediate request 44 continues until the intermediate response 46 includes the appropriate information. Similarly, the dynamic page 36 may transmit more than one intermediate request 44 if more than one code block 72a-72e requires additional information from the client 32. Each time the client 32 transmits an intermediate response 46, the notifier entity 38 receives the response, passes the information on to the executing dynamic page 36, and notifies the executing dynamic page 36 to continue processing.

When the executing dynamic page 36 reaches the end of the final code block 42e (i.e. the end of the dynamic page 36) a result of the executed dynamic page is generated. The result is utilised by the container 35 to generate a final response 48 which is transmitted by the server 34 to the client 32. The final response 48 is the actual response which would be sent under no roundtrip conditions (i.e. single-pass execution). In this way, the author of the dynamic page 36 is able to produce servlet codes based upon existing single-pass execution principles, yet still allow the application to be utilised for applications using conditions which require multiple pass execution (such as voice).

Figure 3:
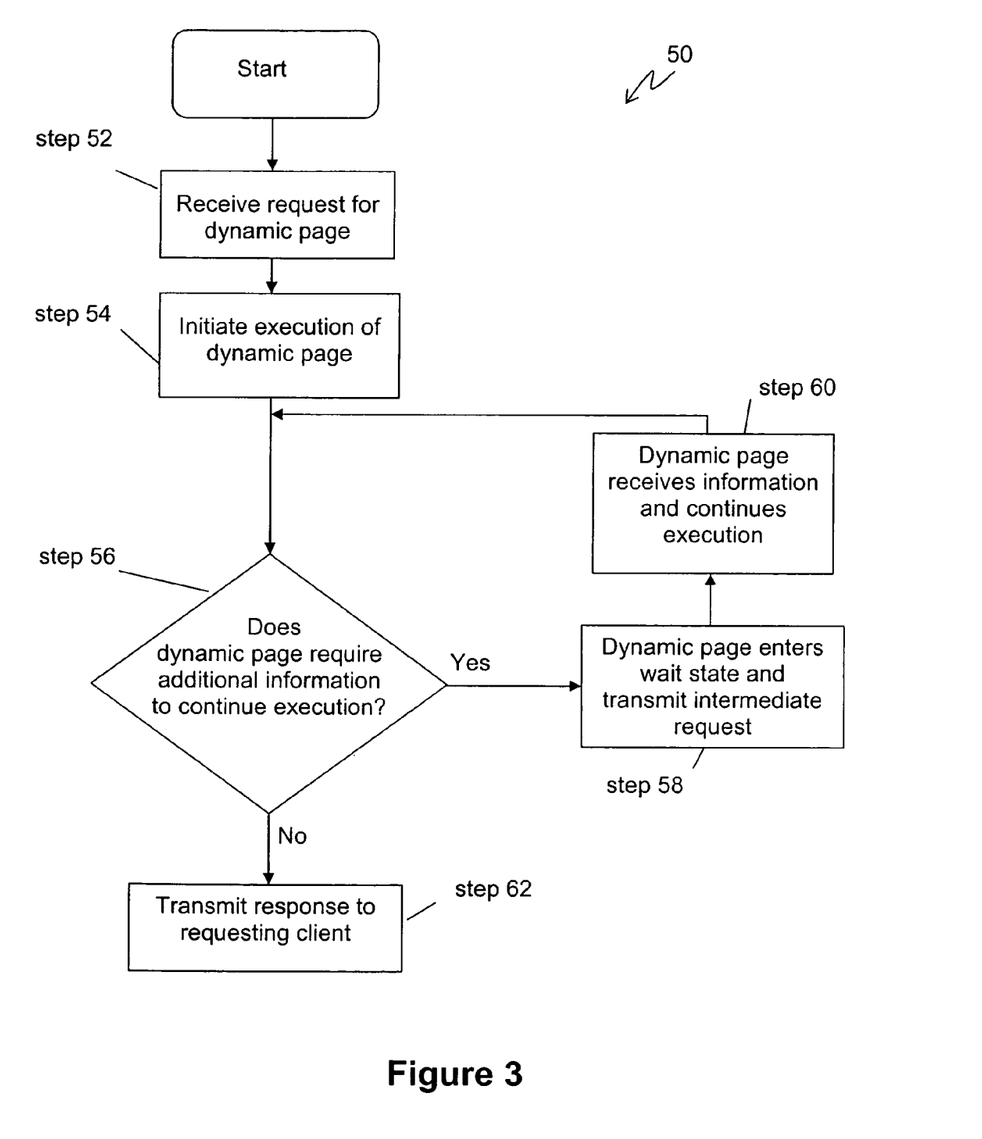
FIG. 3 is a flowchart illustrating the steps for single-pass execution of a dynamic page across multiple request-response cycles.

Referring now to FIG. 3 there is shown a flow diagram 50 of the steps taken when executing a dynamic page 36 according to a preferred embodiment. The server 34 receives a request for a dynamic page 36 (step 52) and passes the request to the container 35 which retrieves the appropriate dynamic page 36. The container 35 then executes the requested dynamic page 36 (step 54). If the requested dynamic page is a JSP, the container 35 will compile the JSP into a corresponding servlet before execution.

At the end of each executed code block, the dynamic page 36 checks to see if additional information is required to execute the subsequent code block (step 56). If it is determined that additional information is required to continue execution, then the dynamic page 36 enters a wait state and transmits an intermediate request to the client 32 (step 58). When the dynamic page 36 receives the requested information, execution continues (step 60) from the point where the wait state was entered. The process of requesting information and suspending execution of the dynamic page 36 until the information is received may occur multiple times during the execution of a dynamic page 36. Once the dynamic page 36 execution reaches the end of the final code block, and it is determined that no further information is required from the client 32 and dynamic page 36 execution concludes. Based upon the result of the executed dynamic page 36, the container 35 generates a final response and the server 34 transmits the final response to the client 32 (step 62).

Figure 4:
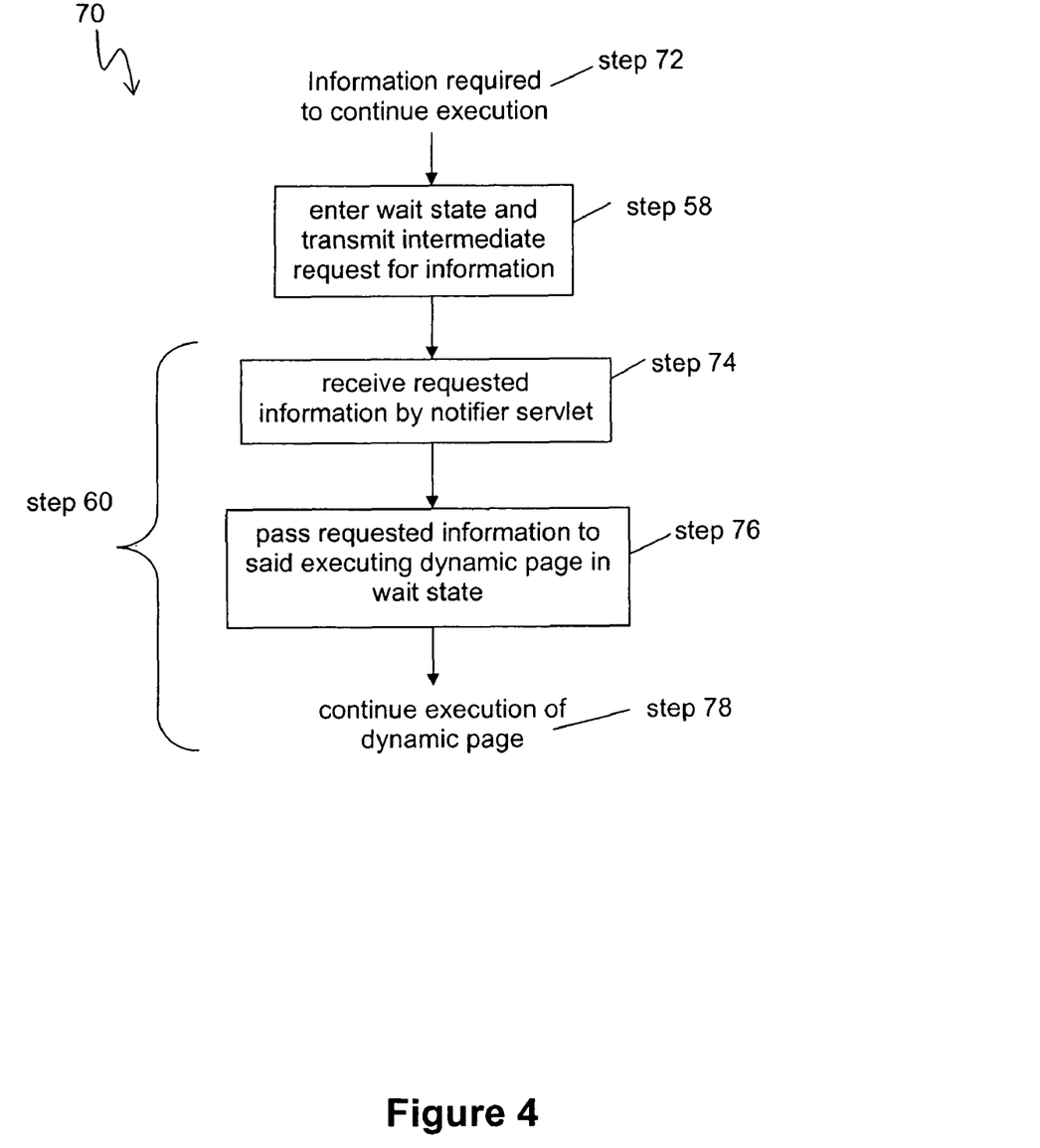
FIG. 4 is a flowchart illustrating the steps taken when the dynamic page requires further information to continue execution.

Referring now also to FIG. 4 there is shown a flow chart 70 elaborating on the steps taken to request additional information from client 32, halt execution of a dynamic page 36 and subsequently resume execution once the additional information is received (steps 58 and 60 of FIG. 3). Once it has been determined that additional information is required to continue execution of the executing dynamic page 36 (step 72), the dynamic page 36 enters the wait state and transmits an intermediate request for additional information to the client 32 (step 58). The response to the intermediate request containing the additional information is received by a notifier entity 38 (step 74). The notifier entity 38 and executing dynamic page 36 are both within a container 35 which contains multiple dynamic pages 36. The notifier entity 38 passes the additional information to the executing dynamic page 36 (step 76) and notifies the executing dynamic page 36 that execution can continue. The executing dynamic page 36, on receiving the additional information exits the wait state, and resumes execution from the subsequent code block 42a-42e (step 78).
Implementation The method of single-pass execution of dynamic pages across multiple request-response cycles is preferably practiced using a general-purpose computer system 100, such as that shown in FIG. 5 wherein the processes of FIGS. 3 and 4 may be implemented as software, such as an application program executing within the computer system 100. In particular, the steps of method of single-pass execution of dynamic pages across multiple request-response cycles are effected by instructions in the software that are carried out by the computer. The instructions may be formed as one or more code modules, each for performing one or more particular tasks. The software may also be divided into two separate parts, in which a first part performs the single-pass execution of dynamic pages across multiple request-response cycles methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for single-pass execution of dynamic pages across multiple request-response cycles.

Whilst the foregoing description focus' primarily upon the execution of JavaServer Pages (JSPs), it will be apparent to those skilled in the art that the method of single-pass execution across multiple request-response cycles is equally applicable to other dynamic pages, such as Microsoft Active Server Pages (ASPs).

Figure 5:
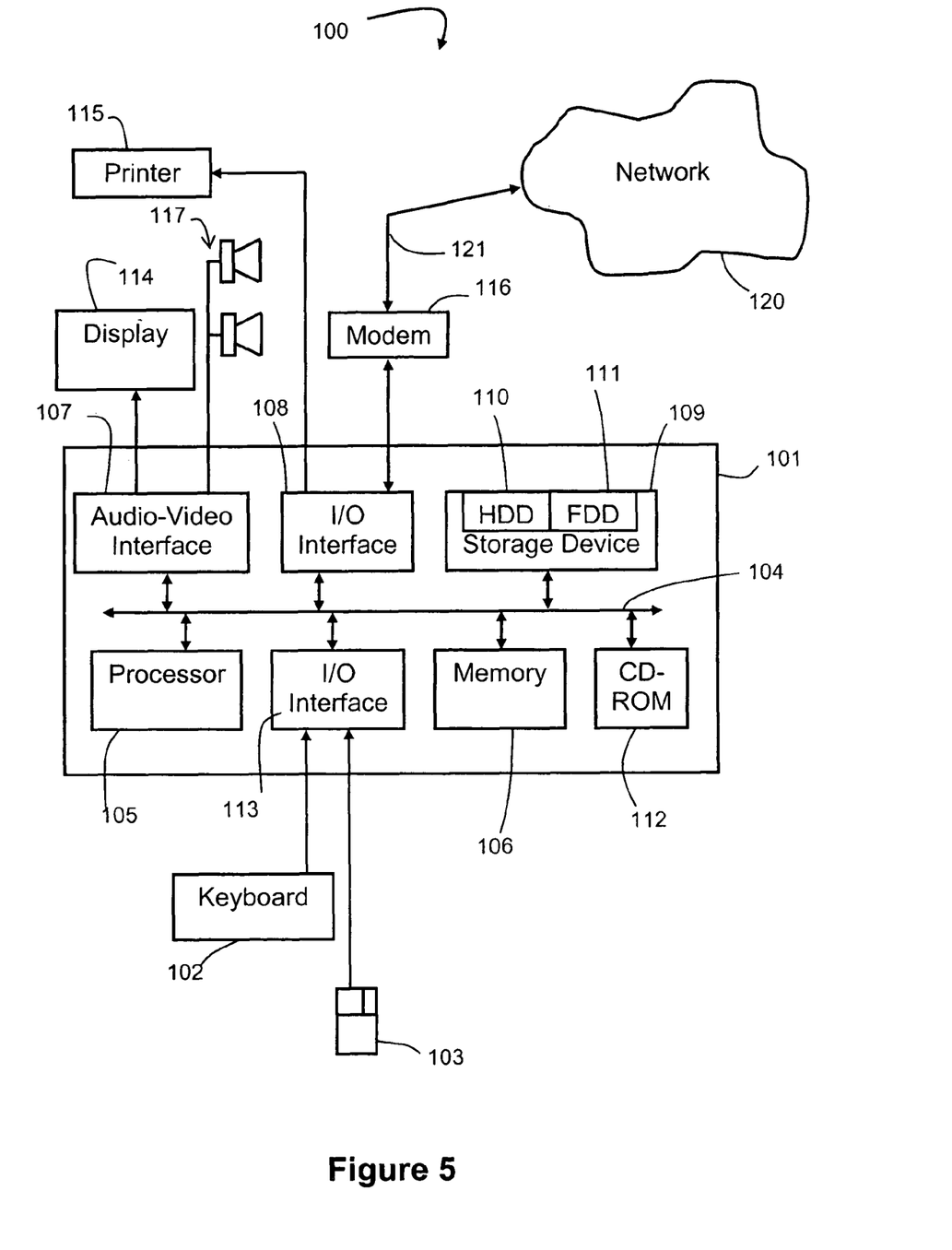
FIG. 5 is a is a schematic block diagram of a general purpose computer upon which the methods described herein may be executed.

The computer system 100 is formed by a computer module 101, input devices such as a keyboard 102 and mouse 103, output devices including a printer 115, a display device 114 and loudspeakers 117. A Modulator-Demodulator (Modem) transceiver device 116 is used by the computer module 101 for communicating to and from a communications network 120, for example connectable via a telephone line 121 or other functional medium. The modem 116 can be used to obtain access to the Internet, and other network systems, such as a Local Area Network (LAN) or a Wide Area Network (WAN), and may be incorporated into the computer module 101 in some implementations.

The computer module 101 typically includes at least one processor unit 105, and a memory unit 106, for example formed from semiconductor random access memory (RAM) and read only memory (ROM). The module 101 also includes an number of input/output (I/O) interfaces including an audio-video interface 107 that couples to the video display 114 and loudspeakers 117, an I/O interface 113 for the keyboard 102 and mouse 103 and optionally a joystick (not illustrated), and an interface 108 for the modem 116 and printer 115. In some implementations, the modem 116 may be incorporated within the computer module 101, for example within the interface 108. A storage device 109 is provided and typically includes a hard disk drive 110 and a floppy disk drive 111. A magnetic tape drive (not illustrated) may also be used. A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art. Examples of computers on which the described arrangements can be practised include IBM-PC\s and compatibles, Sun Sparcstations or a like computer systems evolved therefrom.

Typically, the application program is resident on the hard disk drive 110 and read and controlled in its execution by the processor 105. Intermediate storage of the program and any data fetched from the network 120 may be accomplished using the semiconductor memory 106, possibly in concert with the hard disk drive 110. In some instances, the application program may be supplied to the user encoded on a CD-ROM or floppy disk and read via the corresponding drive 112 or 111, or alternatively may be read by the user from the network 120 via the modem device 116. Still further, the software can also be loaded into the computer system 100 from other computer readable media. The term "computer readable medium" as used herein refers to any storage or transmission medium that participates in providing instructions and/or data to the computer system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of transmission media include radio or infrared transmission channels as well as a network connection to another computer or networked device, and the Internet or Intranets including e-mail transmissions and information recorded on Websites and the like.

We claim:

1. A method for executing a dynamic page on a server-side computer in a client-server environment, comprising:
 receiving a request from a client for execution of said dynamic page in a dynamic webcontent execution environment on said server-side computer;
 initiating execution of said dynamic page in said dynamic webcontent execution environment on said server-side computer, wherein said dynamic page includes a plurality of code blocks each requiring input from said client in series and to be executed in series;
 at each instance when said executing dynamic page requires additional information for one of said plurality of code blocks from said requesting client to continue execution, then:
  transmitting an intermediate request for said additional information from said executing dynamic page on said server-side computer to said client and entering a wait state for said executing dynamic page until a response from said client is received;
  receiving said information from said client by a notifier entity in said dynamic webcontent execution environment on said server-side computer and parsing, extracting and passing said information to said executing dynamic page; and
  continuing execution of said executing dynamic page utilizing said additional information based on receiving notification from said notifier entity; and
 transmitting a response to said client based upon a result of said completely executed dynamic page.

2. The method according to claim 1, wherein the receiving of said request includes receiving a request for a javaserver page (JSP), and compiling said JSP into a servlet.

3. The method according to claim 1, wherein said dynamic page comprises an Active Server Page (ASP).

4. The method according to claim 1, wherein said receiving of said request comprises forwarding said request to a container to locate said requested dynamic page.

5. The method according to claim 1, wherein said passing of said information to said executing dynamic page comprises notifying said executing dynamic page in said wait state to resume execution from the point where said executing dynamic page entered said wait state.

6. A system for executing a dynamic page comprising:
 first receiving means for receiving a request from a client for execution of a dynamic page in a dynamic webcontent execution environment on said server-side computer;
 processing means for processing said dynamic page in said dynamic webcontent execution environment on said server-side computer, wherein said dynamic page includes a plurality of code blocks each requiring input from said client in series and to be executed in series;
 transmitting means for transmitting from said server-side computer to a client an intermediate request for additional information and entering a wait state for said executing dynamic page until a response from said client is received; and
 second receiving means for receiving said additional information from said client in said dynamic webcontent execution environment on said server-side computer and parsing, extracting and passing said information to said executing dynamic page,
 wherein said processing means continues execution of said dynamic page based on being notified by said second receiving means of receiving said additional information,
 wherein said transmitting means is further configured to transmit a response to said client based upon the result of said processing of said dynamic page.

7. The system according to claim 6, wherein said dynamic page enters a wait state prior to said transmitting means transmitting said intermediate request.

8. The system according to claim 6, wherein said second receiving means further comprises means for passing said additional information to said processing means and means for notifying said dynamic page to resume processing utilizing said additional information.

9. The system according to claim 7, wherein said second receiving means comprises a notifier entity.

10. The system according to claim 6, wherein said processing means further comprises means for compiling a Javaserver page (JSP) into a servlet.

11. The system according to claim 6, wherein said processing means further comprises means for suspending execution of said dynamic page and entering a wait state.

12. A non-transitory computer program product comprising a computer readable medium having a computer program recorded therein for performing a method of executing a dynamic page, said method comprising:
 receiving a request from a client for execution of said dynamic page in a dynamic webcontent execution environment on said server-side computer;
 initiating execution of said executing dynamic page in said dynamic webcontent execution environment on said server-side computer, wherein said dynamic page includes a plurality of code blocks each requiring input from said client in series and to be executed in series;
 at each instance when said executing dynamic page requires additional information for one of said plurality of code blocks from said requesting client to continue execution, then:
  transmitting an intermediate request for said additional information from said executing dynamic page on said server-side computer to said client and entering a wait state for said executing dynamic page until a response from said client is received;
  receiving said information from said client by a notifier servlet in said dynamic webcontent execution environment on said server-side computer and parsing, extracting and passing said information to said executing dynamic page; and
  continuing execution of said executing dynamic page utilizing said additional information based on receiving notification from said notifier entity; and transmitting a response to said client based upon a result of said completely executed dynamic page.

13. A system for executing a dynamic page comprising:

a first receiver adapted to receive at least a request from a client for said dynamic page in a dynamic webcontent execution environment on said server-side computer;

a processor adapted to process said dynamic page in said dynamic webcontent execution environment on said server-side computer, wherein said dynamic page includes a plurality of code blocks each requiring input from said client in series and to be executed in series;

a transmitter adapted to transmit an intermediate request from said server-side computer to said client for additional information for one of said plurality of code blocks to said client and enter a wait state for said executing dynamic page until a response from said client is received; and a second receiver adapted to receive said additional information in said dynamic webcontent execution environment from said client and to parse, extract and pass said additional information to said executing dynamic page, wherein said processor continues execution of said dynamic page based on being notified by said second receiver of receiving said additional information, wherein said transmitter is adapted to transmit a response to said client based upon a result of said completely executed dynamic page.

14. The system according to claim 13, wherein said dynamic page is adapted to enter a wait state prior to said transmitter transmitting said intermediate request.

15. The system according to claim 13, wherein said receiver is further adapted to pass said additional information to said processing dynamic page and notify said dynamic page to resume processing utilizing said received additional information.

16. The system according to claim 13, wherein said second receiver comprises a notifier entity.

17. The system according to claim 13, wherein said processor is further adapted to compile a javaserver page (JSP) into a servlet.

18. The system according to claim 13, wherein said processor is further adapted to suspend execution of said dynamic page and enter a wait state.

\* \* \* \* \*